United States Patent
Kelley et al.

(10) Patent No.: US 11,805,352 B2
(45) Date of Patent: Oct. 31, 2023

(54) WIRELESS CHARGING DOCK

(71) Applicant: Plantronics, Inc., Santa Cruz, CA (US)

(72) Inventors: John A. Kelley, Santa Cruz, CA (US); Jacob T. Meyberg Guzman, Santa Cruz, CA (US); Nicholas W. Paterson, Aptos, CA (US); David Laniado Lacarra, Tijuana (MX); Rogers Van Buren Clark, III, Watsonville, CA (US); Roman M. Duran, Ben Lomond, CA (US); Darrin Caddes, Soquel, CA (US); Bowman Wang, Corralitos, CA (US); John B. Ledingham, Scotts Valley, CA (US); Dave Hansung Kim, Santa Cruz, CA (US)

(73) Assignee: Plantronics, Inc., Santa Cruz, CA (US)

( * ) Notice: Subject to any disclaimer, the term of this patent is extended or adjusted under 35 U.S.C. 154(b) by 198 days.

(21) Appl. No.: 17/334,641

(22) Filed: May 28, 2021

(65) Prior Publication Data
US 2022/0386013 A1     Dec. 1, 2022

(51) Int. Cl.
| | | |
|---|---|---|
| *H01M 10/44* | (2006.01) | |
| *H01M 10/46* | (2006.01) | |
| *H04R 1/10* | (2006.01) | |
| *H02J 50/20* | (2016.01) | |
| *H02J 50/00* | (2016.01) | |
| *H02J 7/00* | (2006.01) | |

(52) U.S. Cl.
CPC .......... *H04R 1/1025* (2013.01); *H02J 7/0044* (2013.01); *H02J 50/005* (2020.01); *H02J 50/20* (2016.02); *H02J 2310/22* (2020.01); *H04R 2420/07* (2013.01)

(58) Field of Classification Search
CPC ...... H02J 7/0044; H02J 7/0042; H02J 50/005; H02J 50/10; H02J 50/20; H02J 50/90; H02J 2310/22; H04R 1/1025; H04R 2420/07; H04R 5/0335
USPC ................................ 320/107, 108, 114, 115
See application file for complete search history.

(56) References Cited

U.S. PATENT DOCUMENTS

| | | | |
|---|---|---|---|
| 2010/0062731 A1* | 3/2010 | Ham | G06F 1/1632 455/90.3 |
| 2013/0223640 A1 | 8/2013 | Urano et al. | |
| 2020/0007971 A1 | 1/2020 | Park et al. | |

FOREIGN PATENT DOCUMENTS

| | | | |
|---|---|---|---|
| KR | 101795557 B1 * | 11/2017 | ................ H02J 7/00 |
| WO | 2020/105056 A1 | 5/2020 | |

OTHER PUBLICATIONS www.amazon.com, "EasyAcc Wireleaa Charging with Headphone Stand with 18W Output USB 3.0 Charging POrt 4 USB HUB Compatible with iPhone XR/Xs Max/XS/X/*/* Plus, 10W Fast Charging Galaxy S10/S10 Plus/S10E/ S9 adn More", Apr. 29, 2019, 10 pages.

Sony Corporation, "Infrared Headphone MDR-IF5", https://www.radiomuseum.org/r/sony_infrared_headphones_mdr_i_3.html, Jan. 1, 1988, 1 page.

(Continued)

*Primary Examiner* — Edward Tso
(74) *Attorney, Agent, or Firm* — Quarles & Brady LLP

(57) ABSTRACT

A headset charging dock includes a headset mechanical support configured to hang a first headset by a headband of the first headset; and a wireless charging interface for the first headset, the wireless charging interface integrated in the headset mechanical support.

19 Claims, 7 Drawing Sheets

(56) References Cited

OTHER PUBLICATIONS

Sony, "L600 Digital Surround Wireless Headphones", https://electronics.sony.com/audio/headphones/headband/p/whl600-b, Jan. 1, 2021, 7 pages.

Anonymous: "Best Headphone Stands—Computer Station Nation", Retrieved from the Internet: URL:<https://web.archive.org/web/20210410213810/https://computerstationnation.com/best-headphone-stands/>, Apr. 10, 2021 (Apr. 10, 2021), XP055969718, 9 pages.

* cited by examiner

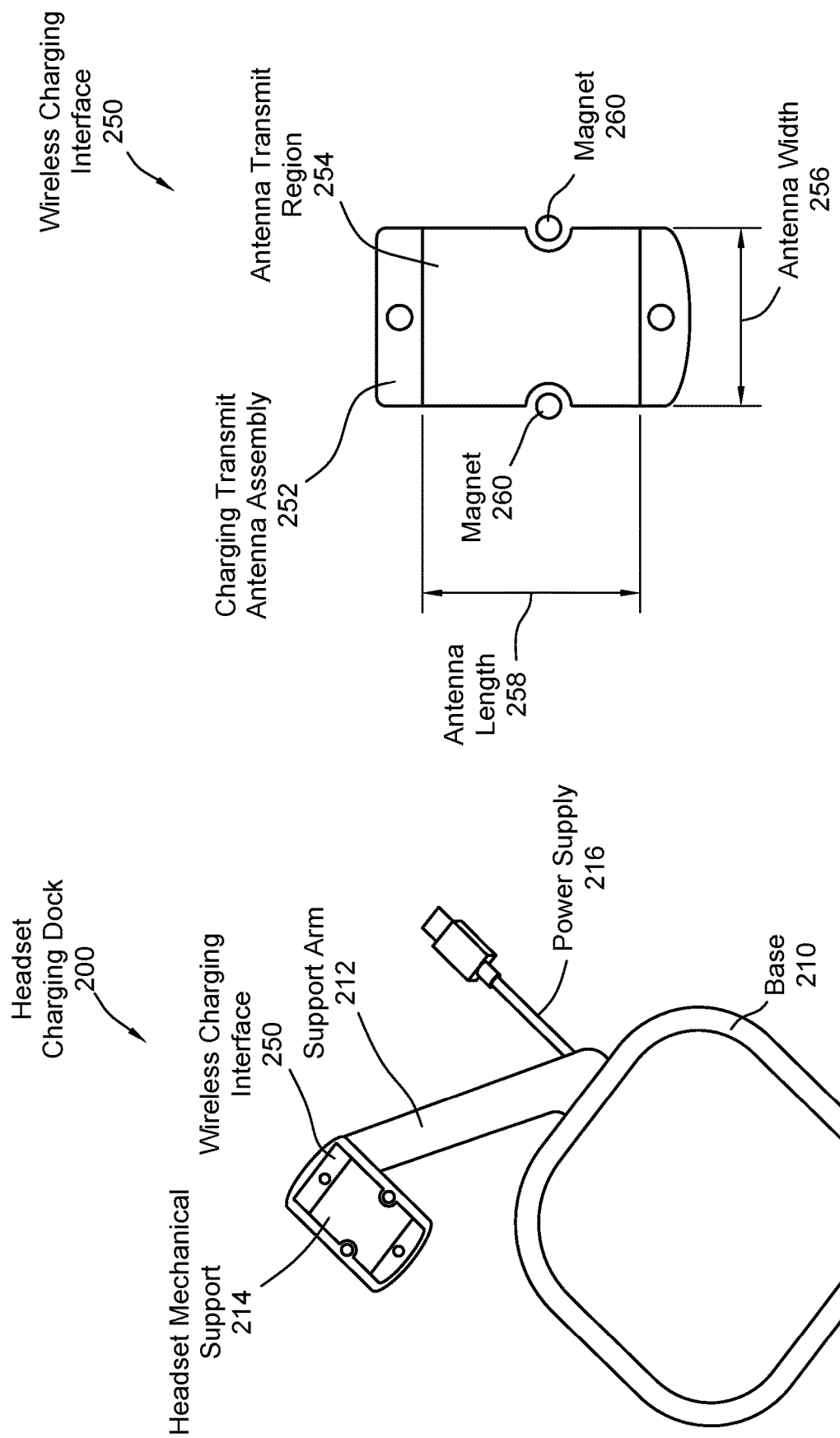

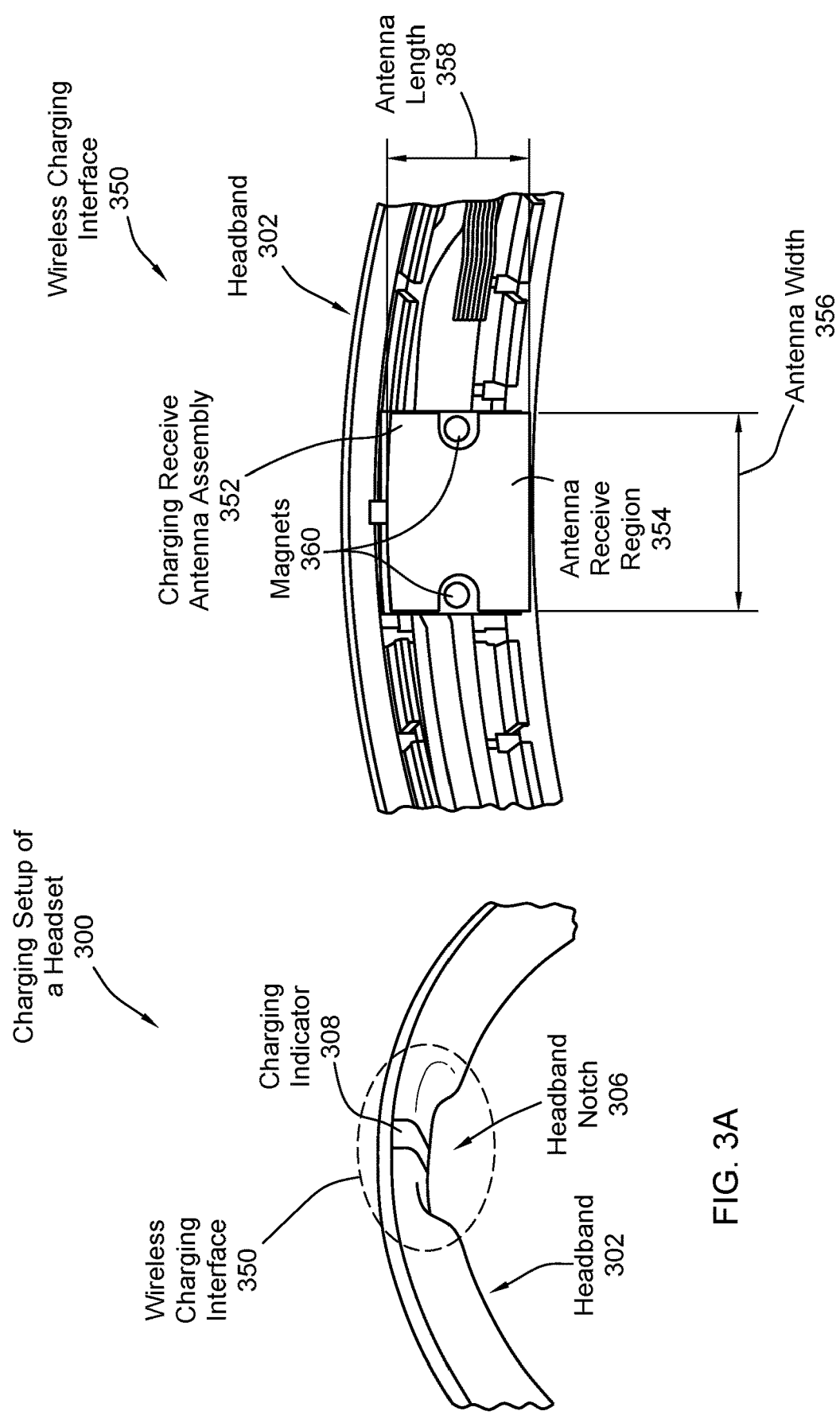

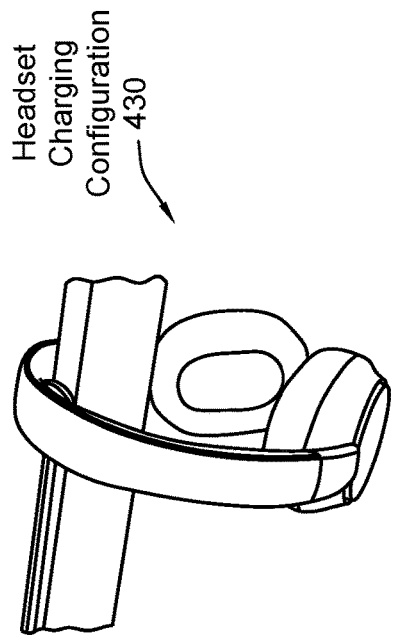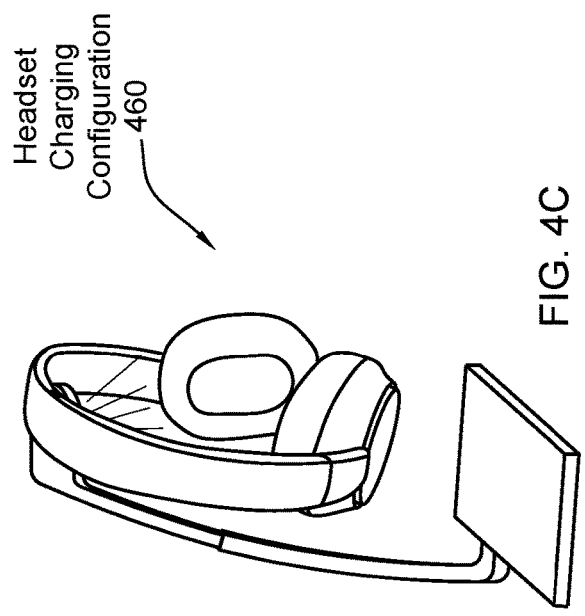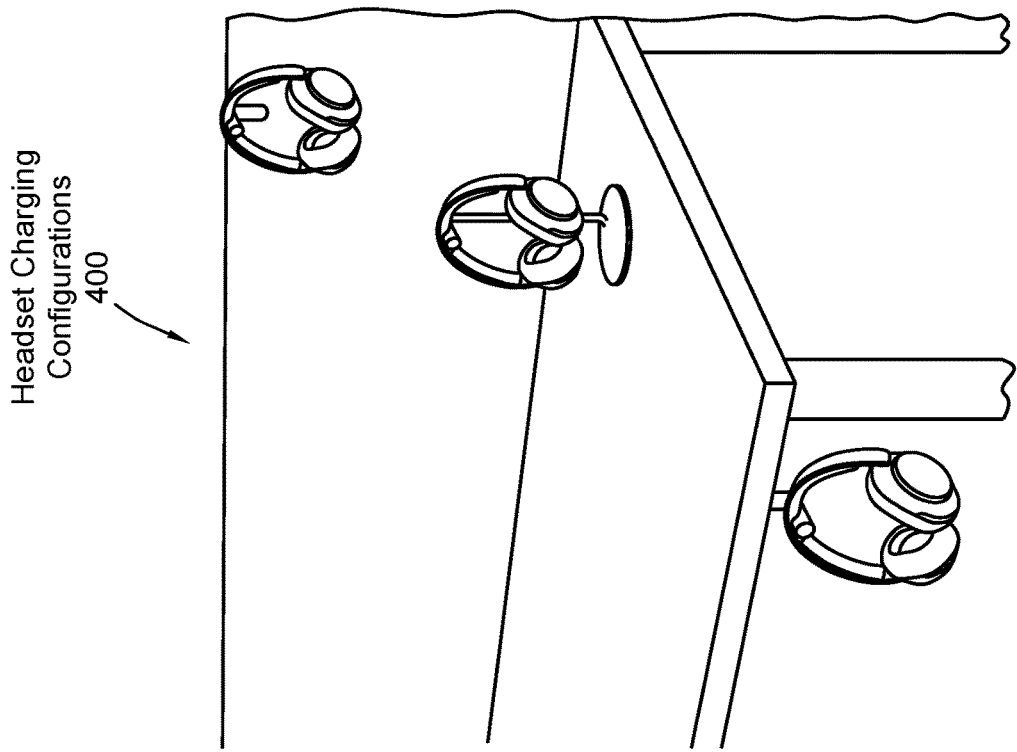

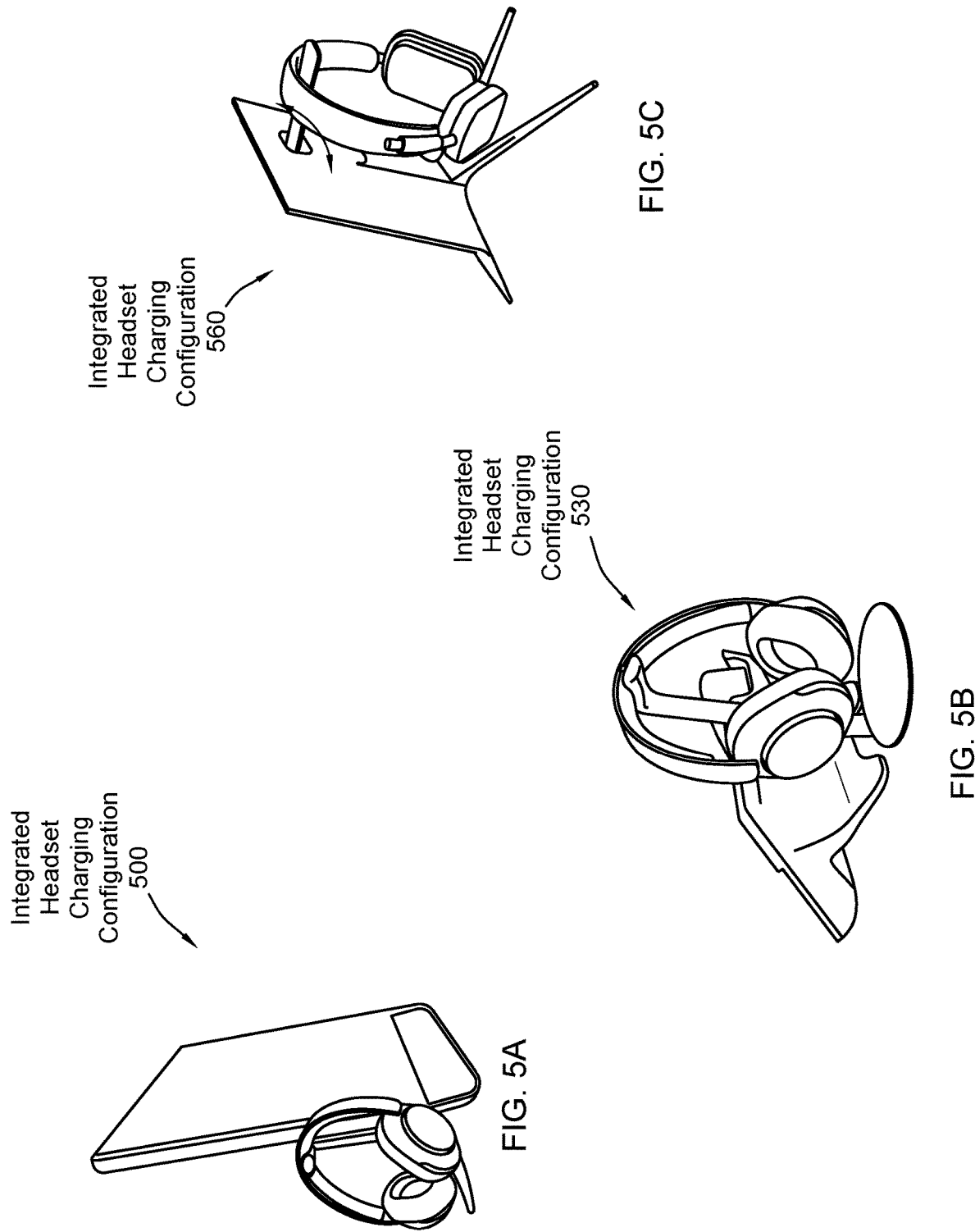

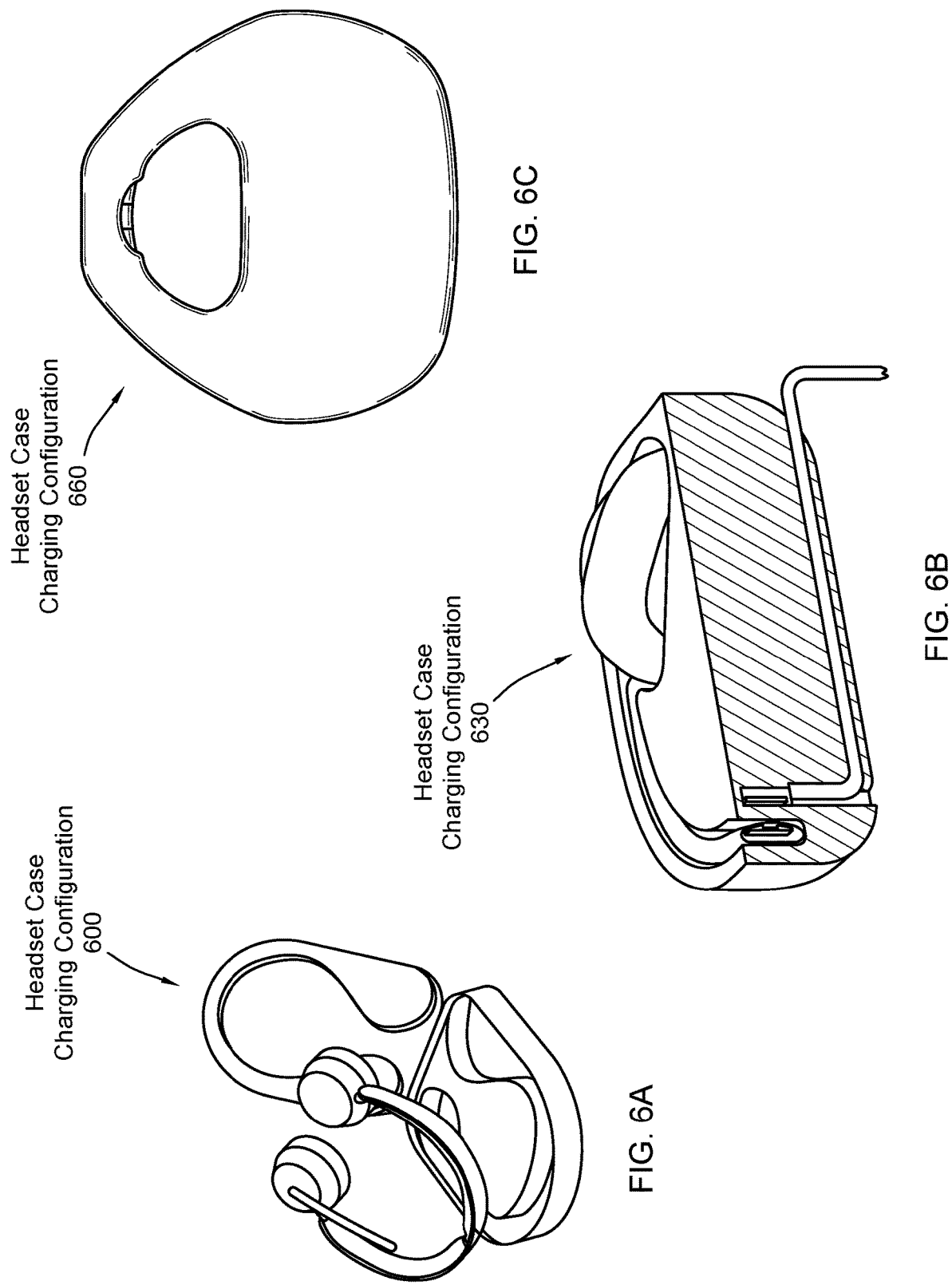

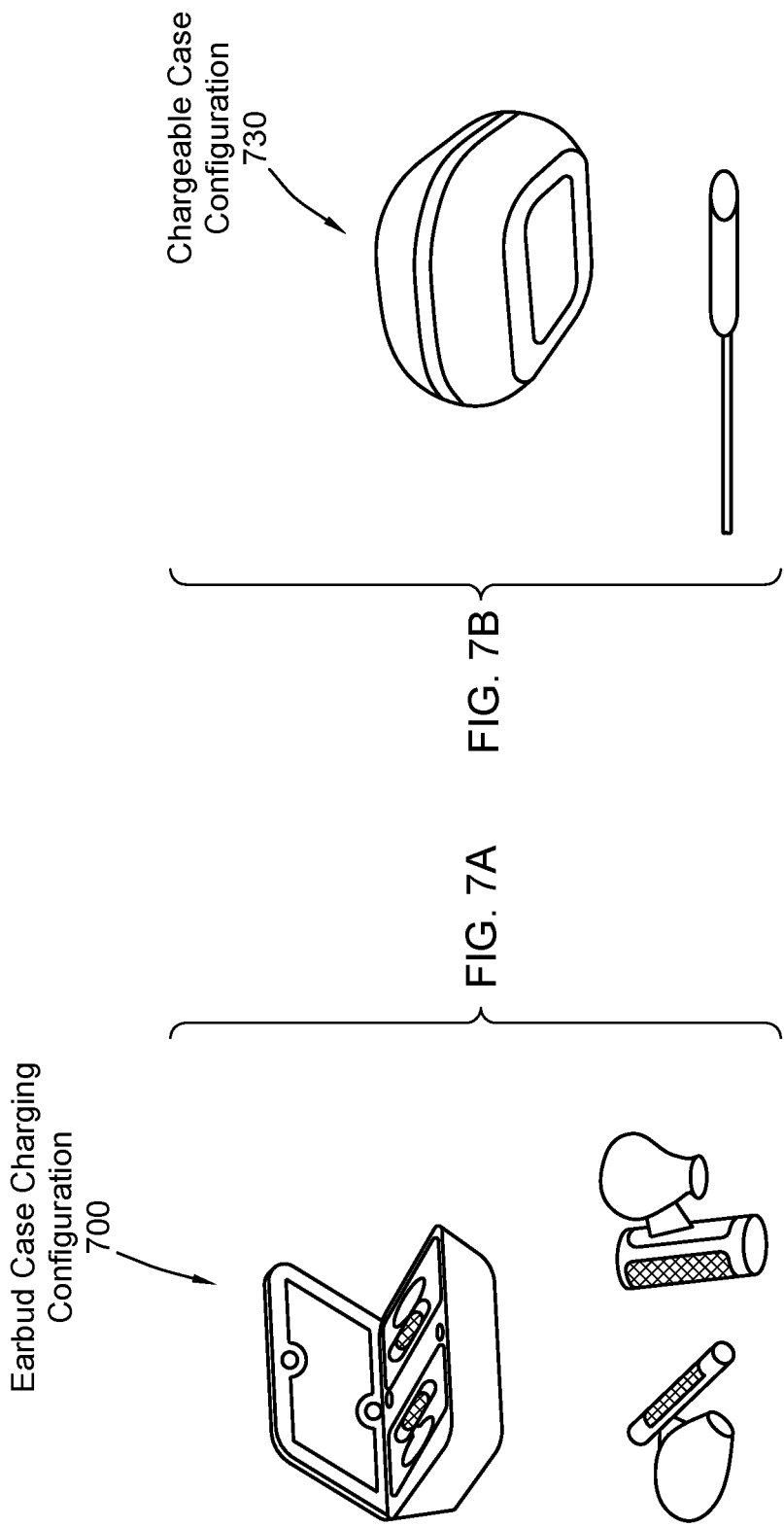

WIRELESS CHARGING DOCK

BACKGROUND

Headsets and other communication devices may include batteries that require periodic charging. Office and/or home environments may include multiple such devices. A universal charging solution may thus be desirable.

SUMMARY

In general, in one aspect, one or more embodiments relate to a headset charging dock comprising: a headset mechanical support configured to hang a first headset by a headband of the first headset; and a wireless charging interface for the first headset, the wireless charging interface integrated in the headset mechanical support.

In general, in one aspect, one or more embodiments relate to a charging setup of a headset, the charging setup comprising: a wireless charging interface disposed on a headband of the headset and configured to enable a wireless charging of the headset by a headset charging dock when the headset is mechanically supported by the headset charging dock at the wireless charging interface.

In general, in one aspect, one or more embodiments relate to a system comprising: a headset charging dock for charging a headset, the headset charging dock comprising: a headset mechanical support configured to hang the headset by a headband of the headset; and a wireless charging interface of the charging dock, the wireless charging interface integrated in the headset mechanical support; the headset, comprising: a wireless charging interface of the headset disposed on a headband of the headset and configured to enable a wireless charging of the headset by the headset charging dock when the headset is mechanically supported by the headset charging dock at the wireless charging interface of the headset.

Other aspects of the disclosure will be apparent from the following description and the appended claims.

BRIEF DESCRIPTION OF DRAWINGS

FIG. 2A shows a headset charging dock, in accordance with one or more embodiments of the disclosure.

FIG. 2B shows a wireless charging interface, in accordance with one or more embodiments of the disclosure.

FIG. 3A shows a charging setup of a headset, in accordance with one or more embodiments of the disclosure.

FIG. 3B shows a wireless charging interface, in accordance with one or more embodiments of the disclosure.

FIG. 4A shows a headset charging configuration, in accordance with one or more embodiments of the disclosure.

FIG. 4B shows a headset charging configuration, in accordance with one or more embodiments of the disclosure.

FIG. 4C shows a headset charging configuration, in accordance with one or more embodiments of the disclosure.

FIG. 5A shows an integrated headset charging configuration, in accordance with one or more embodiments of the disclosure.

FIG. 5B shows an integrated headset charging configuration, in accordance with one or more embodiments of the disclosure.

FIG. 5C shows an integrated headset charging configuration, in accordance with one or more embodiments of the disclosure.

FIG. 6A shows a headset case charging configuration, in accordance with one or more embodiments of the disclosure.

FIG. 6B shows a headset case charging configuration, in accordance with one or more embodiments of the disclosure.

FIG. 6C shows a headset case charging configuration, in accordance with one or more embodiments of the disclosure.

FIG. 7A shows an earbud case charging configuration, in accordance with one or more embodiments of the disclosure.

FIG. 7B shows a chargeable case configuration, in accordance with one or more embodiments of the disclosure.

DETAILED DESCRIPTION

Figure 1B:
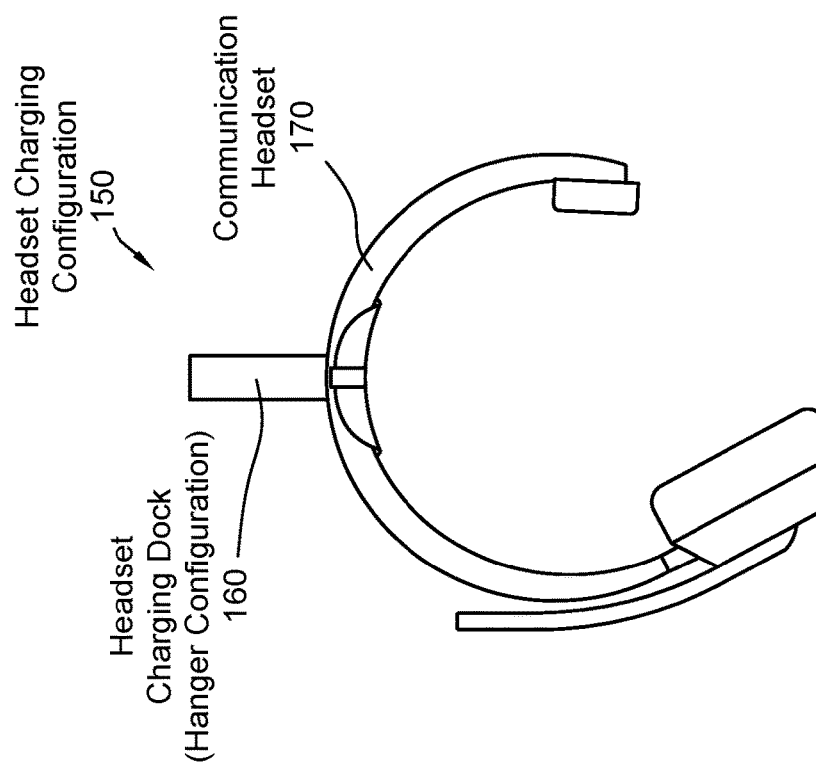
FIG. 1B shows a headset charging configuration, in accordance with one or more embodiments of the disclosure.

Specific embodiments of the disclosure will now be described in detail with reference to the accompanying figures. Like elements in the various figures are denoted by like reference numerals for consistency.

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Further, although the description includes a discussion of various embodiments of the disclosure, the various disclosed embodiments may be combined in virtually any manner. All combinations are contemplated herein.

In general, embodiments of the disclosure provide a device storing and charging solution. The device storage is universal, providing storage and/or charging functionality for multiple devices, including devices of different types. For example, a headset charging configuration in accordance with one or more embodiments supports the charging of different types of headsets using the same charging dock. Embodiments of the disclosure are intuitively operable and visually appealing. In one or more embodiments, the charging is wireless, thereby eliminating the need for exposed electrical contacts that may easily be contaminated, may have electrostatic discharge problems, etc. Various embodiments are subsequently described in reference to the figures.

Figure 1A:
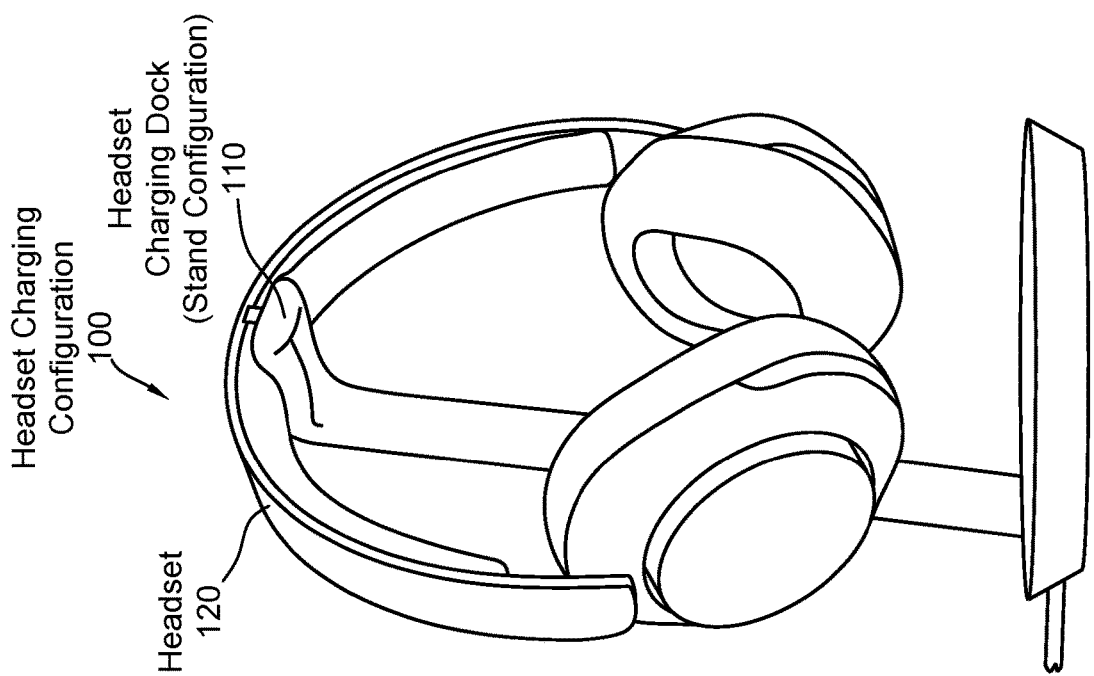
FIG. 1A shows a headset charging configuration, in accordance with one or more embodiments of the disclosure.

Turning to FIGS. 1A and 1B, headset charging configurations (100, 150), in accordance with one or more embodiments, are shown. In FIG. 1A, the headset charging configuration (100) includes a headset charging dock (110) supporting headset (120). Any type of headset with at least one speaker and a headband or a neckband may be used in conjunction with the charging dock (110). The headset may be an on-ear, over-ear, or in-ear headset. The charging dock (110) is in a charging stand configuration as it may be used, for example, on a desk in an office environment. Thus, the charging dock (110) holds the headset when the headset is not in use.

In FIG. 1B, the headset charging configuration (150) includes a charging dock (160) supporting a communication headset (170) equipped with a microphone, in addition to the speaker. The charging dock (160) is in a charging hanger configuration as it may be used, for example, on a cubicle wall. Both the stand configuration (110) and the hanger configuration (160) have in common that any type of headset (e.g., headset (120) or a communication headset (170), binaural, monaural, over the ear, and on ear-type headsets, etc.) may be mechanically supported in a configuration allowing charging of the headset. In one or more embodiments, the mechanical support is provided at the headband (or neckband) of the headset, and a charging interface (discussed below) is provided at the mechanical support. The mechanical support and the charging interface of the headset on the headband may be at a balancing point of the headset. The balancing point of the headset is the location on the headband in which the same weight is on either side of the location. Accordingly, for the headset (120) which are mirror symmetric about a central axis, the mechanical support at the balancing point is at the center of the headband. In contrast, for the asymmetric communication headset (170) (i.e., a monaural headset), the mechanical support at the balancing point is off-center. Additional details and other configurations are discussed below.

Turning to FIG. 2A, a headset charging dock (200), in accordance with one or more embodiments, is shown. The headset charging dock (200) may include a base (210), a support arm (212), a headset mechanical support (214), a power supply (216), and a wireless charging interface (250) integrated in the headset mechanical support (214). The base (210) may be designed for placement of the headset charging dock (200) on a desk or any other substantially horizontal surface. The support arm (212) may extend from the base (210) to mechanically support the headset mechanical support (214), including the wireless charging interface (250). The headset mechanical support (214) may form a base to physically support a headset. The support arm (212) may be sufficiently long to provide vertical clearance above the base (210) for a headset placed on the headset mechanical support (214), e.g., as shown in FIG. 1A. Additional details regarding the headset mechanical support (214) including the wireless charging interface (250) are provided below. In the example shown in FIG. 2A, the power supply (216) is a Universal Serial Bus (USB) interface, which may be connected to any power source providing USB power. The power supply (216) is electrically coupled to the wireless charging interface, such as through a wire in the support arm (212). Other power supplies may be used, without departing from the disclosure. The headset charging dock (200) may include additional functionalities, e.g., as described in reference to FIG. 4C.

Turning to FIG. 2B, a wireless charging interface (250), in accordance with one or more embodiments, is shown. The wireless charging interface (250) includes a charging transmit antenna assembly (252). The charging transmit antenna assembly (252) may include a printed circuit board (PCB) with a transmit antenna on the PCB. An antenna transmit region (254) with an antenna width (256) and an antenna length (258) may be disposed on the PCB, as shown in FIG. 2B. The charging power that may be provided to a headset to be charged may be directly related to the size of the antenna transmit region (254). Accordingly, the antenna transmit region may be sized to provide a level of charging power assumed to be sufficient for the headset(s) to be charged. The antenna width (256) and the antenna length (258) may be selected based on the highest charging power requirement. The charging transmit antenna assembly (252) may be powered by the power supply (216). Components of the charging transmit antenna assembly (252), e.g., charging circuits, may produce heat. In one or more embodiments, to maintain thermal performance, a thermal interface between the charging transmit antenna assembly (252) and the headset mechanical support (214) is used to conduct heat away from the charging transmit antenna assembly (252). The support arm (212) may be made of a thermally conductive material (e.g., aluminum, another metal, or other thermally conductive material), to further dissipate heat.

In one or more embodiments, at least one magnet (260) is placed in the headset mechanical support (214). In the embodiment shown, two magnets (260) are included. The magnets (260) may enable a magnetic alignment of the headset with the headset charging dock (200) for charging. For the magnetic alignment, the magnets (260) may interact with one or more magnets located on or within the headset (i.e., headset magnets). The location of the magnets (260) and the headset magnets is selected to achieve an optimal wireless coupling between the antenna transmit region (254) and an antenna receive region of the headset. The use of magnets thus may enhance the user experience when docking a headset on the headset charging dock (200) by providing a feedback on correct placement of the headset. While two magnets are shown in FIG. 2B, any number of magnets, e.g., one, two, or more magnets may be used.

In the example of FIG. 2B, the magnets (260) are placed on an axis, and with identical polarity, thus allowing a headset to be docked in a reversible way, e.g., facing forward and facing backward relative to the charging dock (200). To avoid interference of the magnetic field produced by the magnets (260) with the electromagnetic field emitted by the antenna transmit region (254), the magnets (260) are placed on the sides of the antenna transmit region (254). In the example of FIG. 2B, the antenna transmit region (254) includes two notches to accommodate the magnets (260).

While the wireless charging interface (250) has been described within the context of the headset charging dock (200), the wireless charging interface (250) may be integrated in other charging configurations, e.g., as described below with reference to FIGS. 4A, 4B, 4C, 5A, 5B, 5C, 6A, 6B, 6C, 7A, 7B, etc.

Turning to FIG. 3A, a charging setup (300) of a headset, in accordance with one or more embodiments, is shown. The charging setup (300) includes a wireless charging interface (350) located on the headband (or neckband) (302) of a headset at the balancing point of the headset where the headset may be hung over a charging dock as illustrated in FIGS. 1A and 1B. The wireless charging interface (350) enables a wireless charging of the headset and is described below in reference to FIG. 3B.

In one or more embodiments, the charging setup (300) further includes a headband notch or neckband notch (306) configured to accommodate the headset mechanical support (214) when docking the headset. The notch (306) thus facilitates the docking of the headset by mechanically aligning the headset on the headset charging dock (200) as the headset mechanical support (214) engages with the notch (306). The notch (306) may be equipped with angled walls to form a narrowing gap, to further facilitate the docking. The notch (306) in the location of the sagittal crest of the head of a user wearing the headset may further avoid pressure in this sensitive area. To obtain sagittal crest relief, the notch (306) may be ~25 mm wide and ~6 mm deep. The notch (306) may have other dimensions, without departing from the disclosure.

The charging setup (300) may further include a charging indicator (308). The charging indicator (308) may be a passive element of an active element. Examples for passive element include a color-coded section, a physically protruding or receding section, a label, etc., e.g., in the center of the notch (306), serving as a visual indicator identifying the wireless charging interface (350). The charging indicator (308) may align with a matching element (e.g. and LED) on the headset charging dock to visually guide docking of the headset with the headset charging dock. Examples for active elements include one or more LEDs, a small display, etc., serving as a status indicator, a level of charge and/or charging indicator, providing instructions, etc.

Turning to FIG. 3B, a wireless charging interface (350), in accordance with one or more embodiments, is shown. The wireless charging interface (350) includes a charging receive antenna assembly (352). When the headset is docked with the headset charging dock, with the headset hanging on the charging dock, the charging receive antenna assembly (352) may pick up an electromagnetic field emitted by the charging transmit antenna assembly (252). The electromagnetic field, thus, provides the energy for charging the headset. As shown in FIG. 3B, the charging receive antenna assembly (352) is located on the underside of the headband to be in close proximity to the charging transmit antenna assembly (252) when the headset is docked. In other configurations, the charging receive antenna assembly (352) may be located elsewhere on the headband, without departing from the disclosure.

The charging receive antenna assembly (352) may include a PCB with a receive antenna on the PCB. The maximum energy may be transmitted between the charging transmit antenna assembly (252) and the charging receive antenna assembly (352) when the overlap between the antenna transmit region (254) of the charging transmit antenna assembly (252) and the antenna receive region (354) of the charging receive antenna assembly (352) is 100%. In one embodiment, the geometry of the antenna receive region is primarily defined by an antenna width (356) and an antenna length (358). The antenna width (356) may be selected to substantially match the antenna width (256) of the antenna transmit region (254). The antenna length (358) may be limited by the width of the headband. For a wider headband, the antenna length (358) may match the antenna length (258). However, for a narrower headband, the antenna length (358) may be less than the antenna length (258).

Generally speaking, the overlap between the antenna receive region (354) and the antenna transmit region (254) may be scaled to produce different power delivery levels. The antenna receive region (354) may be scaled depending on devices power delivery requirements, size of the product, and/or the area available for an antenna. For a headset with limited power requirements, the antenna receive region (354) may be relatively small. For other devices with higher power requirements, e.g., a video camera, a portable speaker, etc., the antenna receive region (354) may be larger and may reach or even exceed the size of the antenna transmit region (254).

While not shown, the charging receive antenna assembly (352) may include other components, e.g., a charging circuit, a battery, etc. At least some of the additional components may be located in other parts of the headset and electrically connected to the charging antenna. The PCB may further include a shielding layer, configured to shield the charging circuit from the electromagnetic field provided by the charging transmit antenna assembly (252).

In one or more embodiments, the magnets (360) interacting with the magnets (260) facilitate an alignment of the antenna receive region (356) with the antenna transmit region (256) to provide a superior electromagnetic coupling between the charging transmit antenna assembly (252) and the charging receive antenna assembly (352). The visual and mechanical alignment, discussed in reference to FIG. 3A, may serve a similar purpose. More specifically, the visual alignment may serve as a general guidance to a user when docking the headset. The mechanical alignment may provide a more precise guidance in one degree of freedom while still allowing a sliding on the charging dock, based on the notch on the headband. The magnetic alignment provides a precise alignment of the headset in a particular position on the charging dock. While the size of the antenna receive region (354) may vary, the spacing of the magnets (360) may remain fixed (e.g. 21 mm spacing). To accommodate the magnets (360), depending on the antenna width (356), the antenna receive region (354) may include notches for the magnets.

Components of the charging receive antenna assembly (352), e.g., charging circuits, may produce heat. In one or more embodiments, to maintain thermal performance, a thermal interface between the charging receive antenna assembly (352) and the headband (302) is used to conduct heat away from the charging receive antenna assembly (352). The headband (302) may include a thermally conductive component (e.g., a stiffening brace made of spring steel or another metal), facilitating the dissipation of heat.

While FIGS. 1A, 1B, 2A, 2B, 3A, and 3C show configurations of components, other configurations may be used without departing from the scope of the disclosure. For example, various components may be combined to create a single component. As another example, the functionality performed by a single component may be performed by two or more components. Additional configurations are subsequently described. Various configurations include wireless charging components. The wireless charging components may be based on any currently existing or future charging standard, including but not limited to. Qi, NFC, Air Fuel, etc., and may also combinations of charging standards.

Turning to FIG. 4A, additional headset charging configurations (400), in accordance with one or more embodiments, are shown. In addition to the charging dock in a desktop configuration, an under-the-desk configuration, and a wall-mount configuration are shown. Aside from the differing form factor, the elements of the headset charging configurations shown in FIG. 4A may operate as previously described. For example, in the under-the-desk configuration, the support arm extends above the headset mechanical support to connect to the base. The base may be affixed to the underside of the desk (as shown) or attach via a clamp (not shown) to the desk. For the wall-mount configuration, the base is excluded.

Turning to FIG. 4B, an additional headset charging configuration (430), in accordance with one or more embodiments, is shown. The headset charging configuration includes a charging rack allowing the storage and/or charging of multiple headsets. The charging rack includes an elongated bar, on which the headsets may be docked. The charging may occur in multiple discrete antenna transmit regions disposed along the bar, or in a single antenna transmit region extending along the bar.

Turning to FIG. 4C, an additional headset charging configuration (460), in accordance with one or more embodiments, is shown. A desktop configuration is shown in FIG. 4C, with the charging dock including a telescoping support arm. The telescoping support arm may provide a height adjustment which may be provide additional clearance for certain headsets, e.g., neckband-style headsets with hanging earbuds. The height adjustment may further be beneficial in applications where devices different from headsets are docked to the charging dock. Examples include cameras, speakers, etc. Further, the charging dock may be equipped with lighting, e.g., LED lighting. With the adjustability provided by the telescoping support arm, the charging dock may serve as a desk lamp. Additionally or alternatively, the charging dock may be equipped with an ultraviolet (UV) light, which may be used to sanitize the headset when docked.

While not shown, the charging dock may include additional functionality. For example, an additional wired or wireless charging interface may be integrated in the base of the charging dock, e.g., to charge a phone or other devices. The charging dock may further include a radio including communication antennas, such as one or more of a Bluetooth, DECT, and Wifi radio to serve as a base station. One or more PCBs may accommodate the circuitry associated with the various functionalities.

In one embodiment, the charging dock includes one or more microphones. The microphones may be used to detect an ambient noise level, for voice and/or noise cancelling, for presence detection, etc. Any other type of sensor or combinations of sensor may be included, without departing from the disclosure.

Depending on what additional components are part of the charging dock, the charging dock may include user interface (UI) controls e.g., for media and telephony. For example, control elements for accepting and rejecting calls, controlling volume, muting, etc., may be included.

Turning to FIGS. 5A, 5B, and 5C, integrated headset charging configurations (500, 530, 560), in accordance with one or more embodiments of the disclosure, are shown. In the configurations shown in FIGS. 5A, 5B, and 5C, the charging dock is integrated with another component. For example, a monitor (integrated headset charging configurations (500, 560)) is equipped with a hook-type charging dock on the side of a monitor (500) and a foldable hook-type charging dock on the back of a monitor (560). Alternatively, the charging dock may be a component separate from the monitor, but interfacing with the monitor, e.g., via a USB interface. A phone (integrated headset charging configuration (530) may also be integrated with the headset charging configuration. In each of the configurations, the hook portion configured to hold the headset (as shown in FIGS. 5, 5B, and 5C) is the headset mechanical support that includes a wireless charging interface. The integration may go beyond mechanical integration and may include a functional integration. The functional integration may include, for example, switching the audio connection from headset to speakerphone when the headset is docked and/or from speakerphone to headset when the headset is undocked. A similar handoff may be provided for other devices such as between a headset and a laptop. The handoff for docking and undocking may be initiated based on a detection of the docking or undocking. Charging or power information may be used for the detection. For example, a handoff of an audio connection from the headset to a speakerphone may be performed when the beginning of charging is detected (when the headset is placed on the charging dock), and a handoff of the audio connection from the speakerphone to the headset may be performed when the charging is interrupted (when the headset is lifted off the charging dock). A data communication (e.g., an availability or non-availability of an NFC data communication between the headset and the charging dock, as further discussed below, may also be used to detect conditions for initiating the handoff.

To enable the functional integration, the charging dock may be equipped with a bi-directional data communication interface such as NFC, providing charging and communication. The data communication interface may be used to exchange pairing or subscription information, to enable audio-switching from one device to another (e.g., between a speakerphone and a headset), to exchange a unique product ID, for a device firmware update, to automatically launch an application, etc. The data communication interface may further be used to manage power, to coordinate charging of multiple devices, e.g., by prioritizing charging, and by monitoring the efficiency and timing of the charging.

Turning to FIGS. 6A, 6B, and 6C, headset case charging configurations (600, 630, 660), in accordance with one or more embodiments of the disclosure, are shown. The headset charging cases include the wireless charging technology as previously described, e.g., in reference to FIGS. 2A, 2B, 3A, and 3B. As visible in the cross-sectional view of FIG. 6B, the charging transmit antenna assembly is integrated into the headset charging case, and a docking is established by inserting the headset into the headset charging case. Foam padding of the case may be shaped to provide alignment of the charging receive antenna assembly of the headset with the charging transmit antenna assembly of the headset charging case.

As another example, the headset charging case may provide an opening, e.g., a slot, allowing the insertion of the charging transmit antenna assembly from outside headset charging case. As shown in FIG. 6C, the slot is shaped to form a handle in the headset charging case. The headset charging case may be hung from a headset charging dock, with the wireless charging interface of the headset charging dock enabling a charging of the headset while in the headset charging case.

Turning to FIG. 7A, an earbud case charging configuration (700), in accordance with one or more embodiments of the disclosure, is shown. The wireless charging case is equipped with a charging transmit antenna assembly disposed in the lid of the charging case. The charging case further includes cavities for a set of wireless earbuds. When placed into the cavities, the earbuds are aligned to enable a wireless charging, with charging receive antenna assemblies of the earbuds facing the charging transmit antenna assembly of the charging case. The charging receive antenna assemblies may be placed, for example, in the stems of the earbuds. Other configurations may hold the in earbuds in the charging case in a different manner. For example, the charging transmit antenna assembly may be disposed on the bottom of the charging case.

FIG. 7B shows a chargeable case configuration (730), in accordance with one or more embodiments of the disclosure, is shown. The chargeable case may be placed on a charging plate to provide charging. As shown in FIG. 7B, the chargeable case may be placed on top of the charging plate, e.g., resting on a desk. Alignment may be mechanically provided based on the shape of the charging plate and a matching shape of the charging case. Alternative embodiments may further include magnets or an adhesive, e.g., to enable a wall-mounted solution. The chargeable case may be used for any type of chargeable equipment, e.g., earbuds.

Embodiments of the disclosure may have one or more of the following advantages. Embodiments of the disclosure enable a universal docking solution of different types of equipment, including headsets. Embodiments of the disclosure combine stowing and charging the equipment. While a corded headset may not be charged if the corded headset does not also include a wireless charging interface, it may also be stowed. Embodiments of the disclosure may save space and may improve efficiency.

For a user, embodiments of the disclosure may ensure that a headset (or other device) is charged, within reach, yet properly stowed, while having a minimum footprint. Additionally, embodiments of the disclosure may provide the user with an automated pairing, audio switching, and other NFC communication-enabled features.

Embodiments of the disclosure eliminate the need for charge cradles with exposed electric contacts, thereby improving visual appeal and reliability. Embodiments of the disclosure are versatile, being available for desktop use, under-desk installation, wall-mount installation, custom mounting options such as a Go Pro mount, and may be combined with other equipment. Embodiments of the disclosure are versatile, being combinable with various types of equipment, including but not limited to headsets, speakers, cameras, etc.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A headset charging dock comprising:
   a headset mechanical support configured to hang a first headset by a headband of the first headset;
   a wireless charging interface for the first headset, the wireless charging interface integrated in the headset mechanical support; and
   at least one support magnet coupled to a side of the wireless charging interface, the at least one support magnet to magnetically align the first headset on the headset mechanical support by magnetically interacting with at least one headset magnet in the first headset.

2. The headset charging dock of claim 1, further comprising:
   a base; and
   a support arm mechanically supporting the headset mechanical support on the base.

3. The headset charging dock of claim 1, wherein the support is telescoping.

4. The headset charging dock of claim 1, wherein the headset charging dock is configured as at least one selected from a group consisting of an under-desk mounting, a wall-mounting, a divider wall-mounting.

5. The headset charging dock of claim 1, wherein the mechanical support is configured to hang at least a second headset, in addition to the first headset.

6. The headset charging dock of claim 1, wherein the wireless charging interface comprises a charging transmit antenna assembly.

7. The headset charging dock of claim 6, wherein the charging transmit antenna assembly comprises a thermal interface to the headset mechanical support.

8. The headset charging dock of claim 1, wherein the wireless charging interface supports at least one selected from the group consisting of the Qi, NFC, and Air Fuel charging standard.

9. The headset charging dock of claim 1, further comprising at least one selected from a group consisting of an LED light, a UV light, a wireless charging interface for an additional device, a Bluetooth radio, a Wifi radio, a DECT radio, and a microphone.

10. The headset charging dock of claim 1, wherein the headset charging dock is integrated with one selected from a group consisting of a phone and a monitor.

11. The headset charging dock of claim 1, wherein the at least one support magnet includes a first support magnet and a second support magnet that are aligned on an axis with identical polarity.

12. A charging setup of a headset, the charging setup comprising:
   a wireless charging interface disposed on a headband of the headset and configured to enable a wireless charging of the headset by a headset charging dock when the headset is mechanically supported by the headset charging dock at the wireless charging interface; and
   at least one headset magnet coupled to a side of the wireless charging interface, the at least one headset magnet to magnetically align the headset on the headset charging dock by magnetically interacting with at least one support magnet in the headset charging dock.

13. The charging setup of claim 12,
   wherein the wireless charging interface is disposed on the headband at a balancing point of the headset.

14. The charging setup of claim 12, wherein the wireless charging interface comprises a charging receive antenna assembly.

15. The charging setup of claim 14, wherein the charging receive antenna assembly comprises a thermal interface to the headband.

16. The charging setup of claim 14, wherein the headset charging dock includes a charging transmit antenna assembly, and wherein a width of the charging receive antenna assembly matches a width of the charging transmit antenna assembly.

17. The charging setup of claim 12, further comprising:
   a notch in the headband, configured to mechanically align the headset on the headset charging dock for the wireless charging by the wireless charging interface.

18. A system comprising:
   a headset charging dock for charging a headset, the headset charging dock comprising:
      a headset mechanical support configured to hang the headset by a headband of the headset;
      a wireless charging interface of the charging dock, the wireless charging interface integrated in the headset mechanical support; and
      at least one support magnet coupled to a side of the wireless charging interface of the charging dock;
   the headset, comprising:
      a wireless charging interface of the headset disposed on the headband of the headset and configured to enable a wireless charging of the headset by the headset charging dock when the headset is mechanically supported by the headset charging dock at the wireless charging interface of the headset; and
      at least one headset magnet coupled to a side of the wireless charging interface of the headset, the at least one headset magnet to magnetically align the headset on the charging dock by magnetically interacting with the at least one support magnet.

19. The system of claim 18, configured to:
perform a handoff of an audio connection from the headset to another device when the headset is docked to the headset charging dock; and
perform a handoff of the audio connection from the other device to the headset when the headset is undocked from the headset charging dock.

* * * * *